United States Patent
Enyeart et al.

(10) Patent No.: US 11,619,316 B1
(45) Date of Patent: Apr. 4, 2023

(54) ONE PIECE VENT

(71) Applicants: Daniel Ray Enyeart, Gladstone, OR (US); Evan Waymire, Oregon City, OR (US)

(72) Inventors: Daniel Ray Enyeart, Gladstone, OR (US); Evan Waymire, Oregon City, OR (US)

(*) Notice: Subject to any disclaimer, the term of this patent is extended or adjusted under 35 U.S.C. 154(b) by 0 days.

(21) Appl. No.: 17/573,923

(22) Filed: Jan. 12, 2022

(51) Int. Cl.
 *F16K 24/04* (2006.01)

(52) U.S. Cl.
 CPC .......... *F16K 24/046* (2013.01); *F16K 24/044* (2013.01)

(58) Field of Classification Search
 CPC ....... F16K 24/044; F16K 24/046; F16K 31/22
 See application file for complete search history.

(56) References Cited

U.S. PATENT DOCUMENTS

| | | | |
|---|---|---|---|
| 5,590,697 A * | 1/1997 | Benjey | F16K 24/042 141/46 |
| 5,762,093 A * | 6/1998 | Whitley, II | B60K 15/03519 137/202 |
| 6,450,192 B1 * | 9/2002 | Romanek | F16K 24/044 137/202 |
| 2002/0046770 A1 * | 4/2002 | Hattori | B60K 15/03519 137/202 |
| 2007/0284001 A1 * | 12/2007 | Yamada | F16K 24/044 137/202 |
| 2013/0075394 A1 * | 3/2013 | Suzuki | B60K 15/04 220/86.2 |
| 2015/0144204 A1 * | 5/2015 | Walkowski | F16K 24/044 137/202 |

FOREIGN PATENT DOCUMENTS

WO   WO-2017163661 A1 *   9/2017   ........... B60K 15/035

OTHER PUBLICATIONS

Machine English translation of WO2017163661 (Year: 2022).*

* cited by examiner

*Primary Examiner* — Hailey K. Do
(74) *Attorney, Agent, or Firm* — Ingrid McTaggart

(57) ABSTRACT

A one piece vent formed from one integral piece of material, such as Aluminum, and which defines a fluid pathway therethrough having a borehole within said fluid pathway, and further including a groove that retains a roto clip therein so as to secure a ball and a float within an interior of the vent, the float movable between a sealing position on said borehole and an unsealed position away from said borehole.

14 Claims, 1 Drawing Sheet

SECTION A-A

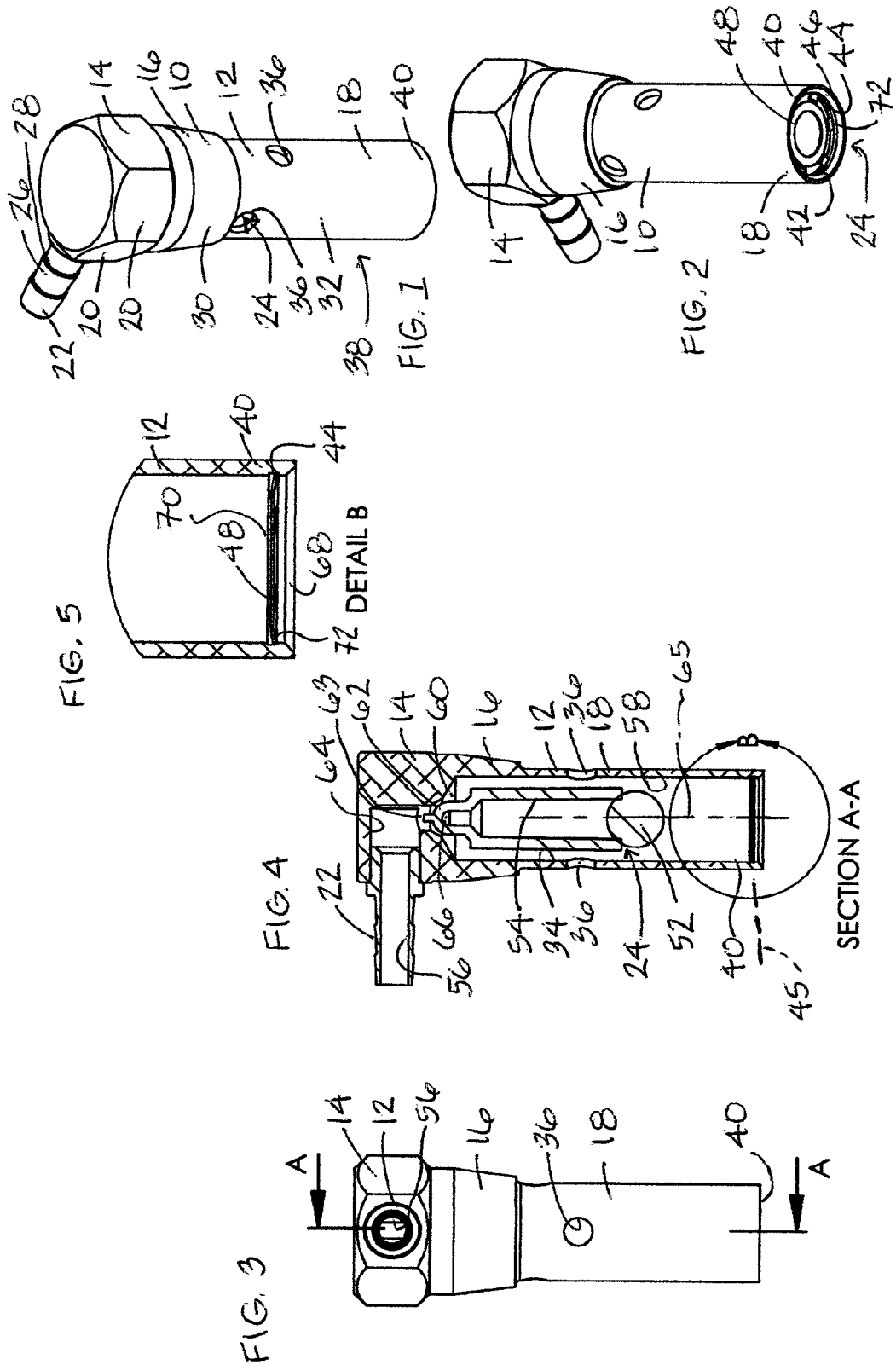

ONE PIECE VENT

TECHNICAL FIELD

The present invention relates to a one piece vent and a process of manufacturing the same, for use in commercial vehicles, for example, and more particularly, to a vent manufactured of one integral piece of material, such as Aluminum, and which includes a groove that retains a roto clip therein so as to secure a ball and a float within an interior of the vent.

BACKGROUND OF THE INVENTION

The present invention is particularly intended for use on commercial vehicles, although it may be used with any internal combustion engine connected to a fuel tank. In one particular application, a truck may include a fuel tank that is vented, i.e., allows the escape of vapor from the fuel tank, under normal operating conditions. However, in the event of a rollover condition, wherein the truck, and therefore the fuel tank, is not positioned in a normal, upright position, fuel may leak out through the vent aperture. This is an undesirable and dangerous condition. There is a need therefore for a safety vent that provides for a vapor release during normal working conditions and which provides an air tight seal during a rollover event. In particular, there is a need for a vent which is less time intensive and less expensive to manufacture, and which will more securely secure a float and a ball therein, than prior art designs.

SUMMARY OF THE INVENTION

The present invention provides a one piece vent which is installed directly on a fuel tank, and a process of manufacturing the same. One aspect of the present invention provides a pressure relief vent that is manufactured of a single, integral piece of material, such as Aluminum. The vent includes a groove on an interior surface so as to retain a roto clip therein, which in turn secures a ball and a float within an interior of the vent. This system and manufacturing method provides a cost savings over prior art devices because the manufacturing process is expedient and cost effective, and the resulting vent provides for the secure retention of the ball and float within the interior of the vent.

BRIEF DESCRIPTION OF THE DRAWINGS

FIG. 1 is an isometric view of one example embodiment of a one piece vent.

FIG. 2 is another isometric view of the vent of FIG. 1.

FIG. 3 is a front view of the vent of FIG. 1.

FIG. 4 is a side cross-sectional view of the vent of FIG. 3, taken along section line A-A.

FIG. 5 is a detailed side cross-sectional view of region B of FIG. 4.

DETAILED DESCRIPTION OF THE PREFERRED EMBODIMENTS

The invention discloses a one piece vent that is intended for use on commercial vehicles, although it may be used on any vented tank.

FIG. 1 is an isometric view of one example embodiment of a one piece vent 10. Vent 10 includes a vent body 12 which includes a top region 14, a middle region 16 and lower region 18. Top region 14 includes six flat surfaces 20 arranged in a hexagon type shape so as to allow manipulation of vent 10 with a wrench (not shown). Top region 14 further includes a hollow hose barb 22 which may allow a hose (not shown) to be secured to barb 22 and, therefore, to be connected to a hollow interior 24 of body 12. Hose barb 22 may include inclined surfaces 26 with edges 28 that help to retain a flexible hose or tube (not shown) on hose barb 22.

Middle region 16 may include a tapered outer surface 30 that tapers inwardly from flat surfaces 20 of top region 14 toward an exterior cylindrical surface 32 of lower region 18. Middle region 16 may define a hollow interior 34 (see FIG. 4). Tapered outer surface 30 defines a thickened region which adds structural integrity and strength to body 12.

Lower region 18 includes several apertures 36 that allow fluid and/or vapor flow between an exterior 38 and hollow interior 24 of body 12. Lower region 18 also includes an open lower end region 40 (see FIG. 2) that defines an aperture 42.

FIG. 2 is another isometric view of the vent 10 of FIG. 1. Lower region 18 includes open lower end region 40 that defines a groove 44 in an interior surface 46 of lower region 18. Groove 44, in the embodiment shown, extends completely around interior surface 46 of lower region 18 and is positioned close to aperture 42 of lower region 18.

A retaining device, such as a biased spring clip, namely a roto clip, 48 is secured within groove 44. Groove 44 ensures that roto clip 44 will not become dislodged from vent body 12 during rollover or high pressure conditions of a fuel tank to which the vent is secured. Roto clip 44 includes a central aperture 50 that allows fluid and vapor flow from exterior 38 of vent 10 to the interior 24 of vent 10 through central aperture 50, while retaining a ball 52 and a float 54 (see FIG. 4) within hollow interior 24 of vent 10. In the embodiment shown, body 12 may be manufactured of Aluminum and roto clip 48 may be manufactured of steel. Float 54 may be manufactured of a buoyant material such as plastic and ball 52 may be made of a heavily weighted material, such as stainless steel. Other materials may be utilized as may be desired for a particular application.

FIG. 3 is a front view of the vent of FIG. 1 showing the hollow interior 56 of hose barb 22.

FIG. 4 is a side cross-sectional view of the vent 10 of FIG. 3, taken along section line A-A. Body 12 of vent 10 is shown manufactured of a single, integral piece of material, namely Aluminum in this embodiment, such that top region 14, middle region 16 and lower region 18 are manufactured of a single piece of material having no breaks, transitions or seams therebetween. The continuous piece of material that makes up body 12 may be manufactured by a molding process with a cast, by machining a solid piece of material, or by any other process that allows production of body 12 as a single, integral piece of material. Manufacturing vent body 12 from one piece of material adds strength to vent 10 because the body 12 does not includes breaks, transitions, seams or weak points that may become separated during harsh environmental conditions and jarring driving conditions of the vehicle on which vent 10 is mounted. Manufacturing vent body 12 of a single piece of material also provides for cost and time efficient manufacturing because the single vent body may be manufactured in a single manufacturing step thereby eliminating the steps of securing multiple pieces of a part together.

Still referring to FIG. 4, hollow interior 24 of body 12 generally defines a cylindrical hollow cavity 58 that terminates at aperture 42 in open lower end region 40 of vent body 12, and also includes a tapered hollow region 60 at an opposite end of cylindrical hollow cavity 58 from open lower end region 40. Tapered hollow region 60 is positioned in the interior 24 of vent body 12 at the transition between middle region 16 and top region 14. Tapered hollow region 60 transitions into a bowl shaped hollow region 62 in top region 14 that communicates through a borehole 63 with a hollow hose barb receiving recess 64 so that hollow interior 24 of vent 12 is in fluid and air flow communication with hollow interior 56 of hose barb 22. Bowl shaped hollow region 62 is shaped to receive a rounded end region 66 of float 54 so that when float 54 is raised by an uppermost level of fluid (not shown) within vent body 12, rounded end region 66 of float 54 is forced upwardly into bowl shaped hollow region 62 and seals borehole 63 so that fluid or air flow through borehole 63 is prevented. When a fluid level in the tank is in a lower condition, float 54 will lower, thereby removing the rounded end region 66 of float 54 with contact of borehole 63, thereby moving the float 54 to an unsealed position on borehole 63. Rounded end region 66 may be manufactured of a flexible material such as rubber or any other such material as may be suitable for sealing borehole 63. In this manner fluid overflow will not occur from vent 10 outwardly through hollow hose barb 22.

During normal operations of the vehicle on which vent 10 is mounted, ball 52 will rest downwardly within body 12, on roto clip 48. During rollover conditions, when the fuel tank is upside down, heavy ball 52 will be moved by the force of gravity toward top region 14 of vent 10, thereby forcing rounded end region 66 of float 54 to seal borehole 63, and thereby preventing fuel from spilling through borehole 63 outwardly from vent 10 and a fuel tank attached thereto.

Hollow interior 56, tapered region 60, bowl shaped region 63 and borehole 63 are each aligned along an elongate axis 65 of vent body 12. Hose barb receiving recess 64 is positioned perpendicular to elongate axis 65. Groove 65 is positioned in a plane 45 that is positioned perpendicular to elongate axis 65.

FIG. 5 is a detailed side cross-sectional view of region B of FIG. 4. This figure shows groove 44 positioned on interior surface 46 in open lower end region 40 of hollow interior 24 of body 12. Groove 40 may be machined or cast into body 12 during manufacturing, or formed by any other means as desired for a particular application. Roto clip 48 is retained within open lower end region 40 of body 12 by groove 44. Open lower end region 40 may include an inclined surface 68 so as to facilitate ease of placement of roto clip 48 into hollow interior 24 of body 12 and movement into groove 40 for securement therein. Roto clip 48 may comprise a central section 70 and downwardly extending arms 72 around an outer perimeter of the roto clip, which will resist displacement of the roto clip out of groove 40 and out of body 12, from a force internal of body 12, such as ball 52 and/or float 54 resting on the top of roto clip 48. Downwardly extending arms 72 of roto clip 48 are guided by inclined surfaces 68 of open lower end region 40 to center roto clip 48 within groove 40 during installation of the clip within body 12. The central aperture 50 of roto clip 48 allows fluid flow therethrough but is sized to prevent float 54 or ball 52 from passing therethrough so as to retain the ball 52 and the float 54 within hollow interior 24 of body 12.

In the above description numerous details have been set forth in order to provide a more through understanding of the present invention. It will be obvious, however, to one skilled in the art that the present invention may be practiced using other equivalent designs.

We claim:

1. A vent, comprising:
 a vent body manufactured of a single piece of material and having an absence of discontinuities therein, said vent including a first region, a second region and a third region, said first region including an aperture extending partially therethrough, said second region including a hollow interior fluidly connected to said aperture through a bore, and said third region including an opening, said opening fluidly connected to said hollow interior; and,
 a float positioned within said hollow interior, said float movable within said hollow interior between an unsealed position wherein said float is positioned out of contact with said bore and a sealed position wherein said float seals said bore,
 wherein said hollow interior of said second region includes a hollow cylindrical region that extends through said third region of said vent body, and a tapered region that extends into said first region, said tapered region fluidly connected to said aperture through said bore,
 wherein said hollow interior of said second region further includes a bowl shaped hollow region extending from said tapered region to said bore, said bowl shaped hollow region fluidly connected to said aperture through said bore.

2. The vent of claim 1 further comprising a hose barb secured within said aperture of said first region, said hose barb including a hollow central region fluidly connected to said hollow interior of said vent body second region through said bore.

3. The vent of claim 1 wherein said float includes an elongate cylindrical section including at a first end a tapered shoulder, and further comprising a cylindrical tip section extending outwardly from said tapered shoulder, said cylindrical tip section including a seal positioned on an end of said cylindrical tip section, said seal adapted to seal said bore when said float is moved into a sealing position within said hollow interior of said vent, wherein said cylindrical tip section defines a diameter less than a diameter of said elongate cylindrical section.

4. The vent of claim 1 further comprising a ball positioned within said hollow interior between said float and said opening.

5. The vent of claim 4 wherein said third region further comprises a groove positioned around an interior surface of said third region, said vent further comprising a retainer positioned within said groove, said retainer retaining said float and said ball within said hollow interior.

6. The vent of claim 5 wherein said interior surface of said third region includes an inclined surface adapted to guide said retainer into said groove.

7. A vent, comprising:
 a vent body manufactured of a single piece of material and having an absence of discontinuities therein, said vent body defining an elongate axis and including an aperture extending partially through said vent body and positioned perpendicular to said elongate axis, said vent body further including a bore fluidly connected to said aperture, a hollow cavity and an opening in an end of said vent body positioned opposite said vent body from said aperture, wherein said bore, said hollow cavity and said opening are each positioned along said elongate axis and are fluidly connected with one another, and wherein said aperture, said bore, said hollow cavity and said opening define a continuous fluid path through said vent body; and,
 a movable structure positioned within said hollow cavity, said movable structure manufactured of a material that floats in fuel, wherein said movable structure seals said bore when said vent body is in a tipped position, wherein said hollow cavity includes a cylindrical region that defines a diameter, a tapered shoulder region and a cup shaped region that defines a diameter less than said diameter of said cylindrical region, wherein said tapered shoulder region tapers inwardly from said cylindrical region to said cup shaped region, and wherein said cup shaped region terminates in said bore and is adapted to receive said seal positioned on said movable structure, said seal sealing said bore when said vent body is in said tipped position.

8. The vent of claim 7 wherein said movable structure defines a cylindrical tip region having a seal secured thereon.

9. The vent of claim 7 further comprising an attachment structure secured within said aperture and extending outwardly from said vent body and perpendicular to said elongate axis.

10. The vent of claim 7 wherein said vent body includes a recess positioned in an interior surface of said hollow cavity, said vent further comprising a retainer secured within said recess, said retainer retaining said movable structure within said hollow cavity.

11. A vent, comprising:

a vent stem manufactured of a single, integral, piece of material and having an absence of seams therein, said vent stem defining an elongate axis and including a first cavity extending partially through said vent stem and positioned perpendicular to said elongate axis, said vent stem further including a second cavity fluidly connected to said first cavity through a borehole and extending along said elongate axis from said first cavity to an end of said vent stem opposite from said first cavity, said vent stem further including a recess positioned within an interior surface of said vent stem in said second cavity, said recess positioned in a plane positioned perpendicular to said elongate axis;

a movable structure positioned within said second cavity, said movable structure manufactured of a material that floats in fuel, wherein said movable structure seals said borehole between said first cavity and said second cavity when said vent stem is in a tipped position; and a retaining structure secured within said recess of said second cavity, said retaining structure retaining said movable structure within said second cavity of said vent stem, wherein said second cavity includes a cup shaped recess that terminates at a first end at said borehole and is connected at a second end to a tapered surface, said tapered surface connected to a cylindrical shaped cavity that extends from said tapered surface to an end region of said vent stem opposite from said first cavity.

12. The vent of claim 11 further comprising a hose barb positioned within and extending outwardly from said first cavity, said vent stem and said hose barb together defining a continuous fluid pathway completely through said vent extending from an exterior of said vent, through said hose barb, through said first cavity, through said borehole, through said second cavity, through said retaining structure and outwardly to an exterior of said vent.

13. The vent of claim 11 wherein said second cavity includes a cup shaped recess that terminates in said borehole, and wherein said movable structure includes a hemispherical shaped seal movably positioned within said cup shaped recess between a sealing position on said edge of said borehole and an unsealed positioned out of contact with said edge of said borehole.

14. The vent of claim 13 further comprising a weighted ball positioned within said second cavity between said movable structure and said retaining structure.

* * * * *